Oct. 20, 1959      D. H. INGHRAM      2,909,436
METHOD FOR PRESSURE COOKING CANNED GOODS
Original Filed May 26, 1955
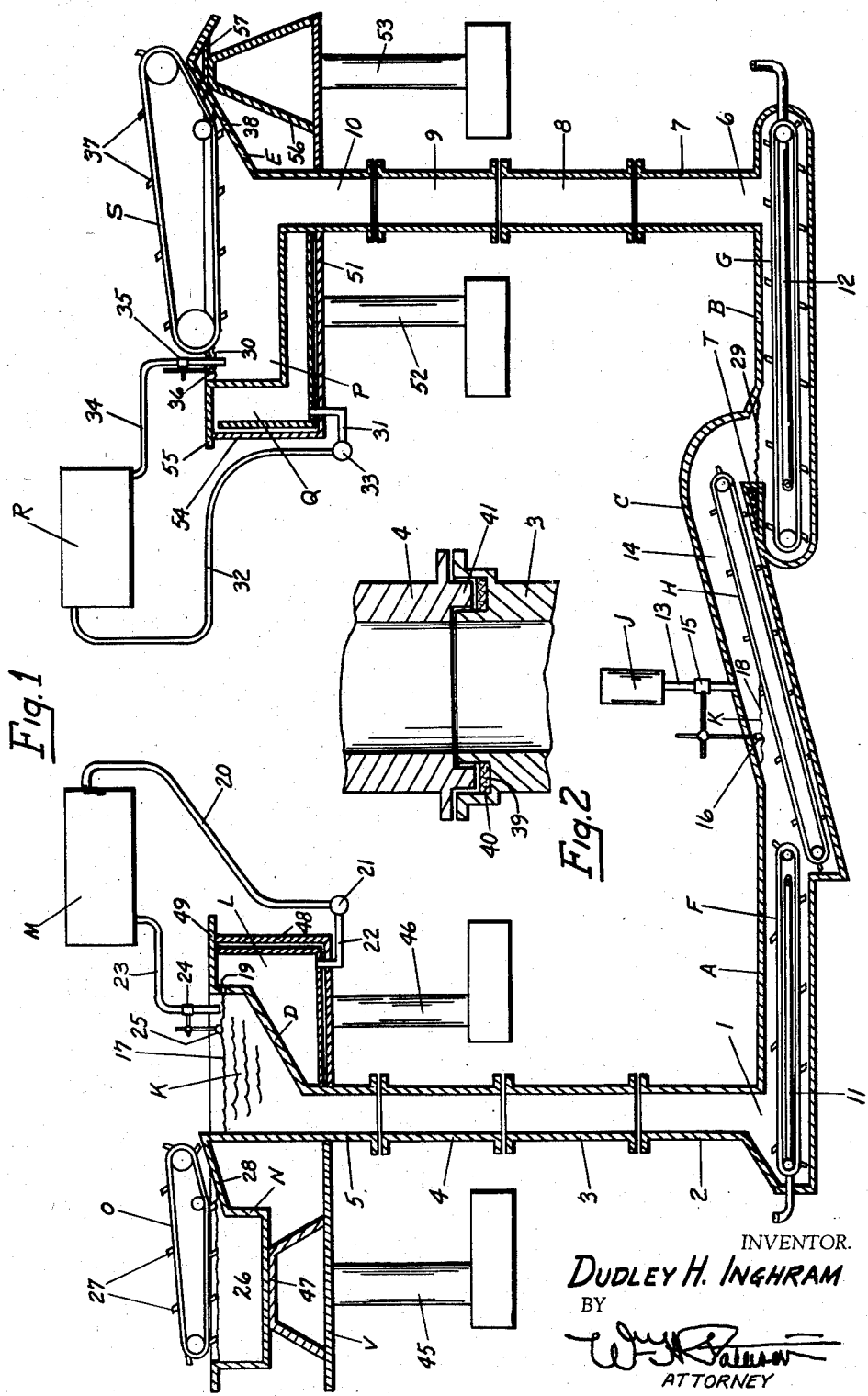
INVENTOR.
DUDLEY H. INGHRAM
BY
ATTORNEY United States Patent Office 2,909,436
Patented Oct. 20, 1959

2,909,436
METHOD FOR PRESSURE COOKING CANNED GOODS

Dudley H. Inghram, Omaha, Nebr.

Original application May 26, 1955, Serial No. 511,177, now Patent No. 2,794,385, dated June 4, 1957. Divided and this application April 15, 1957, Serial No. 652,909

5 Claims. (Cl. 99—214)

The present invention relates to a method for pressure cooking canned goods and is a division of my U.S. Patent No 2,794,385, dated June 4, 1957.

The present method is one wherein there is a continuous uninterrupted flow of canned goods and one which assures continuous and uniform cooking temperature and obviates the necessity of repeated handling of the goods with a consequent material reduction in the cost of the cooking operation.

Other objects and advantages of the invention will be apparent to those skilled in the art and will be understood from the following description when read in the light of the accompanying drawings.

In the drawings:

Fig. 1 is a view partly in section and partly in elevation and to some degree diagrammatic in nature of an apparatus for practicing the improved method.

Fig. 2 is a fragmentary enlarged view in vertical section illustrating the connection between a pair of stand-pipe sections.

The apparatus used in the practice of my method comprises a pair of spaced-apart horizontally disposed tanks one of which is a cooking tank A and the other a cooling tank B. These tanks are interconnected by an air lock C the precise purpose of which will be hereinafter described.

At its inlet end 1 the cooking tank is in communication with a stand-pipe made up of a plurality of sections 2, 3, 4 and 5 while the outlet end 6 of the cooling chamber is in communication with a stand-pipe made up of a plurality of sections 7, 8, 9 and 10.

The uppermost stand-pipe section 5 has its upper end enlarged to form a tank D and the upper section 10 of the other stand-pipe is enlarged to form a tank E.

As will be hereinafter described the cooking chamber A and its stand-pipe are filled with a liquid and the cooling chamber B and its stand-pipe are also filled with a liquid. A steam carrying pipe or pipes 11 are disposed in the cooking chamber and are supplied with steam from some suitable source of supply, not shown. A refrigerant coil or coils 12 are disposed in the cooling chamber and are connected to any suitable type of refrigerant apparatus, not shown.

An endless type conveyor F is horizontally disposed within and extends lengthwise of the cooking chamber and an endless type horizontally disposed conveyor G extends lengthwise of the cooling chamber. A vertically inclined endless type conveyor H extends upwardly from the delivery end of the conveyor F and terminates in the air lock or air chamber C at a point above the reception end of the conveyor G.

A tank J containing compressed air provided from any suitable source, not shown, has an outlet pipe 13 adapted for communication with the interior 14 of the air lock. A normally closed valve 15 is in the air line 13 and is operated by a float 16 disposed within the air lock chamber on the surface of the cooking fluid K.

The cooking fluid or solution is water, but it could be any other liquid of substantially the same specific gravity as water with a boiling point in the neighborhood of 300° F.

The cooking fluid or solution completely fills the cooking tank and the stand-pipe thereof. It will appear later that as cans are conveyed to and deposited in the cooking chamber stand-pipe these will displace water and to maintain the proper water level, which is indicated at 17 at the top of the stand-pipe and at 18 within the air lock, this displaced water is permitted to overflow the upper edge 19 of the uppermost stand-pipe section 5 and flow into the overflow tank L.

A supply of water for the cooking side or system of the device is maintained in the tank M. A flexible pipe 20 interconnects this reservoir and the tank L through a pump 21 and a second pipe 22 at the bottom of the overflow tank. The pump 21 will return the overflow fluid to the reservoir. A third pipe 23 delivers water from the reservoir to the upper end of the uppermost stand-pipe section 5. This pipe intermediate its length is provided with a normally closed valve 24 which is moved to open and closed positions by a float operator 25.

The cooking end of the apparatus is the receiving end and filled and sealed cans are suitably delivered to a reception tank N having therein a liquid 26 of high specific gravity within which the cans will float. There is an endless type conveyor O having thereon a plurality of pusher blades 27 which pass over and extend slightly down into the fluid 26 within the reception tank. This conveyor operates to engage cans floating in the tank and pushes them up the inclined ramp 28 thereof and dumps them in the water K at the upper end of the cooker chamber stand-pipe section 5.

The cooling chamber and the entire associated and communicating stand-pipe are filled with a cooling solution having a high specific gravity and one sufficiently high so the filled cans will float therein. This cooling liquid or solution is designated as an entirety by P and its level within the air lock is indicated at 29 and within the tank E at 30.

The levels of this fluid will vary in accordance with the number of cans traveling through the cooling side of the mechanism and accordingly provision for handling overflow fluid and supplying additional fluid is provided.

There is an overflow tank Q and a supply tank or reservoir R. The bottom of the overflow tank is connected with the reservoir through the pipes 31 and 32 in which a pump 33 is disposed. Liquid is replenished to this side of the system from the tank R to the tank P through the flexible pipe 34 having in its length a normally closed valve 35 which is operable to open and closed positions by the float 36.

An endless type conveyor similar to the conveyor O described is associated with the tank P. This conveyor S is provided with a plurality of pusher blades 37 to travel over and in the surface of the fluid within the tank P and engages the floating cans and pushes them up the inclined ramp 38 where they are delivered to any suitable conveyor system which will take them to what is known as the "case off" room of the packing plant.

An insulated barrier or dam T extends across the air lock chamber beneath the conveyor H and prevents the cooling fluid from reaching the cooking chamber. The fluids are also prevented from joining by reason of the air pressure which is maintained in the air lock. The degree of this air pressure will be referred to hereinafter.

The degree of pressure and its maintenance within the system and the manner in which it may be varied will now be described. For every two foot of height of liquid in the stand-pipes there is approximately one pound of pressure. The stand-pipes accordingly are made of the proper length to provide the proper pressure within the lower chambers. Once the stand-pipes are made of the proper heights no alteration or change is necessary where a single product is to be processed. Where different pressures are desired or necessary it is intended to add or remove intermediate stand-pipe sections. For this reason a simple yet efficient joint is provided between the abutting ends of sections. In Fig. 2 the upper end of section 3 and the lower end of section 4 are illustrated. Here it will be seen that section 3 is provided at its upper end with a groove 39 having in its bottom a packing 40. The lower end of the pipe section 4 is provided with a circumferential tongue 41 which extends into the groove and rests upon the packing. As will hereinafter appear, there is always weight upon these sections and it has been found that the joint described is adequate to prevent leakage.

By reason of the adjustability of the heights of the stand-pipes it is necessary to provide means for raising and lowering the loading and unloading facilities or mechanisms of the system. This could be done in many ways other than that illustrated and now to be described.

The device illustrated for raising and lowering the loading facilities of the device comprises a platform V and a pair of hydraulic lifts each embodying a lift cylinder 45 and 46. At one end the platform is provided with an elevated portion 47 upon which the reception tank N rests and at its other end the platform is provided with an end wall 48 upon which the top 49 of the overflow tank rests.

No illustration is made of the mechanism for operating the hydraulic lifts as such devices are well known and understood and are commonly used. One place where lifts of this kind are in common use is in service stations for raising automobiles for lubricating jobs.

A cylinder lift is provided for the unloading facilities of the device. In this instance the platform is 51 and the hydraulic lift pistons or cylinders are 52 and 53. An end wall 54 of the platform supports one end 55 of the overflow tank top while an elevated or raised portion 56 of the platform is beneath the opposite end 57 of the tank top.

It will be seen that through proper positioning of the elevating means a portion of the weights of the loading and unloading mechanisms can be placed upon the upper stand-pipe sections 5 and 10 with the result that the section interconnections, illustrated in Fig. 2, are rendered liquid-tight due to the engagement under pressure of the tongue of one section with the packing in the groove of the other section.

The coolant fluid in the cooling end of the mechanism is one which is of sufficiently high specific gravity that the loaded and sealed cams will float therein. There are numerous such fluids, one of which is a concentrated solution of calcium chloride.

The purpose of the air lock C, in addition to providing an apparatus through which the cans can be continuously progressed without the loss of pressure in the cooking section of the device, is to maintain the pressures constant in both the cooking and cooling sections of the apparatus and to maintain the liquids at the proper level. The pressure within the air lock will be maintained at the same pressure exerted upon the fluids in the chambers A and B by the fluids in the two stand-pipes. If the pressure brought about by the pressure in the stand-pipes is seven pounds per square inch, that will be the pressure maintained in the air reservoir J. However, the maintenance of the proper pressure in the air lock could be accomplished by means of a pressure control valve in the air line 13 should it be so desired. Such a regulator would be set for the proper air pressure which should be maintained in the air lock.

Obviously the air or gas pressure in the air lock will maintain the fluids at their proper levels and prevent them overflowing or filling the air lock. The pressure in the air lock accordingly constitutes a dam or barrier which prevents the cooking fluid from reaching and commingling with the coolant fluid.

There is no illustration of the drive means for any of the endless conveyors. It is intended that there be speed regulators for the drive means of these conveyors but inasmuch as speed regulators for conveyors are old and well known, illustration of them is considered unnecessary. There are many speed regulated conveyors on the market and the one most suited to the present apparatus would be selected.

Attention is directed to the fact that the cooking fluid could be an oil and the coolant fluid water. With these particular fluids there would be a natural separation of the cooking fluid from the coolant fluid when the two become mixed with one another by a carry-over of the cooking fluid into the coolant fluid from the cans. Cooking fluids carried over into the coolant fluid could be re-claimed by a simple run-off method.

Having described an apparatus by which the present improved method can be practiced, a short description of the operation of the apparatus will now be given.

The method is intended for use on large scale operations in which cans may be filled and sealed at the rate of as high as eight to ten thousand cans per hour. The capacity of the present device is not limited as enlargement of the overall size of the parts making up the apparatus would result in increasing its capacity, as will be readily apparent.

The present method might well be called a "sink and float" method in that the cans are permitted to sink into the cooker portion of the apparatus and float outwardly from the cooler portion of the apparatus. The feed to the device is or can be continuous and reduces to the minimum the manual labor incident to a pressure cooker for canned goods.

The filled and sealed cans are suitably brought to and dumped into the liquid within the reception tank N in which they will float. The cans are pushed from this tank by the conveyor O into the enlarged upper end D of the stand-pipe section 5. Water within this stand-pipe and also the cooking chamber at the lower end thereof is maintained, by the heating pipes or elements 11, at the proper temperature to properly cook the contents of the cans.

Immediately upon entering the upper end D of the stand-pipe section 5 the cans sink to the bottom onto the conveyor F in the cooking chamber. Here the water is at the proper temperature and is maintained at the desired pressure by making the stand-pipe of the proper predetermined height. The pressure within this chamber can be varied by inserting or removing stand-pipe sections.

At this point it might be pointed out that the stand-pipe for the cooking chamber could be disposed at an inclination to the vertical if it were found that the cans sink so rapidly downwardly through the stand-pipe as to injure them when they reach the bottom and contact the conveyor.

Upon reaching the conveyor F the cans are conveyed through the cooking solution within the cooking chamber A. Through proper setting of the speed regulator the cans will be caused to remain in the cooking solution the proper length of time to be properly cooked.

As the cans enter the stand-pipe and leave the cooking chamber the level of the liquid will be caused to rise and fall which would vary the pressure at the bottom of the stand-pipe, that is, within the cooking chamber. To prevent this variation in pressure the hereinbefore described manner of permitting an overflow of water from the top stand-pipe section 5 is provided. Should more cans be leaving the cooking chamber than are entering, the level of the liquid would fall and this would result in the actuation of the float valve 25 to cause the liquid level to be immediately brought back to the proper level.

When the cans reach the end of the conveyor F they fall upon the conveyor H and are carried through the air lock C and are dropped off into the coolant fluid 29 within the cooling portion of the apparatus. As pointed out, this coolant fluid has a specific gravity such that the cans will float therein. The cans accordingly remain above the conveyor B and are carried or pushed by that conveyor to the lower end 6 of the stand-pipe made up of the sections 7 to 10 inclusively. The adjustment on the speed regulator drive of this conveyor is made such that the cans will remain in the chamber B the proper length of time to be adequately cooled.

Immediately the cans reach the lower end of the stand-pipe they float upwardly into the discharge tank P and float up against the conveyor S by which they are pushed up the ramp 38 for discharge to proper conveying means which will carry them to the "case off room" of the establishment.

The liquid level can change in the cooling portion of the apparatus by variance in the delivery of cans into this section of the device and in the delivery of the cans from the discharge tank. It will be understood that the liquid of the coolant is maintained through provision for overflow into the overflow tank Q and the delivery of additional fluid under the control of the float valve 36.

Most canned products have almost neutral buoyancy in water. Where the buoyancy of the filled cans is such that they will float in water a slightly different arrangement is necessary, as will be hereinafter described.

Inasmuch as it takes a greater length of time to perform the cooking operation than the cooling operation there should be no crowding or jamming up of cans in the cooling side of the apparatus. In any event proper adjustments of the several conveyors will assure proper and continuous flow of cans through the apparatus.

The apparatus has the particular desirable attribute that it will handle cans of any size or shape without alteration of the mechanism. Actually cans of different sizes and shapes can be processed at the same time provided the cooking periods for the contents of the cans is the same or substantially the same. This is a particularly desirable attribute as where changes or alterations are necessary for handling cans of different sizes and shapes a great deal of time is lost which increases materially the cooking operation.

Departures from the specific mechanical arrangements shown and described can be made without departing from the inventive concept. Where the nature of the canned goods is such that the cans depart from neutral buoyancy in water, such as for instance shoe-string potatoes, cans of this material would have to be conveyed through the apparatus in covered baskets. To provide for this would not be difficult. The conveyors F, G and H would be eliminated and a continuous conveyor extending from the upper stand-pipe section 5 through the cooking chamber, air lock, cooling chamber and upwardly out of the stand-pipe for the cooling chamber would be provided. The baskets would be suitably secured to this conveyor and carried through the machine by the conveyor element.

The fluid in the can reception tank N and in the coolant side of the apparatus is identical and hence any can which will not float in the coolant liquid will not float in the reception tank liquid and would therefore not be delivered to the cooker chamber.

The apparatus illustrated and described is to be considered illustrative of the inventive concept and not limitative thereof. If space is an important consideration space could be saved by inclining the two stand pipes toward one another. Additionally by the use of proper conveyors and proper shaping of the air lock the coolant chamber could be positioned to parallel the cooking chamber.

What I claim is:

1. The method of continuously processing canned goods comprising, progressing the cans through a heated liquid having a specific gravity such that the cans will sink therethrough, then progressing the cans through a chilled liquid having a specific gravity such that the cans float therein, and then removing the cans from the surface of the chilled liquid.

2. A method as defined in claim 1 wherein, the chilled liquid is a calcium chloride solution.

3. The method of continuously processing canned goods which comprises, delivering the filled and closed cans into a confined vertical column of liquid having a specific gravity such that the cans will sink therethrough, progressing the cans through a horizontally extending confined body of liquid which communicates with the lower end of said vertical liquid column and which is heated to a temperature such that the contents of the cans will be properly cooked, progressing the cans through said horizontally extending body of liquid and into a second horizontally extending enclosed body of liquid which is out of contact with the first named body of liquid and which has a specific gravity such that the cans will float therein, progressing the cans through said second body of liquid and into and through a communicating confined vertical column of like liquid, chilling the liquid constituting the said second body of liquid and the liquid comprising the last named vertical column, permitting the cans to float to the top surface of the last named vertical column of liquid, and then removing the cans from the top of said vertical liquid column.

4. A method as defined in claim 3 wherein, the chilled liquid is a calcium chloride solution.

5. A method as defined in claim 3 wherein, an air lock which is in communication with both horizontally extending bodies of liquid is provided to prevent contact between said bodies of liquid, maintaining a pressure in said air lock equal to the pressure exerted upon the liquids in the horizontally extending bodies of liquid by the vertical columns of liquid, and mechanically progressing cans through said air lock from the heated liquid to the chilled liquid.

References Cited in the file of this patent

UNITED STATES PATENTS

| | | |
|---|---|---|
| 1,377,088 | Martin | May 3, 1921 |
| 1,584,397 | Paxton | May 11, 1926 |
| 2,710,260 | Reed | June 7, 1955 |